Oct. 10, 1967

P. FIELDS 3,346,688

FORK-TYPE WIRING HARNESS

Filed Nov. 12, 1964

INVENTOR:
Paul Fields

By [signature]
Attorney 3,346,688
Patented Oct. 10, 1967

3,346,688

FORK-TYPE WIRING HARNESS

Paul Fields, Los Angeles, Calif., assignor to Litton Systems, Inc., Beverley Hills, Calif.

Filed Nov. 12, 1964, Ser. No. 410,674
4 Claims. (Cl. 174—68)

This invention relates to wiring harnesses and, more particularly, to fork-type harnesses for affixing bundles of electrical conductors or other filamentary elements in a structural arrangement determined by the equipment with which the conductors are associated.

It is often necessary to run a number of conductors together from one area to another area of a particular piece of equipment. Bundles of conductors are also often run from one piece of equipment to another piece of equipment. The bundle form is used to eliminate stray electrical effects. Wherever possible, the conductors are associated within a single insulating conduit. Quite often, however, individual wires must be taken from the bundle at selected points and connected to other portions of the equipment. Bundles from which individual wires must be selected, manifestly, cannot be enclosed within closed conduits.

In order to maintain all of the conductors of a particular bundle in fixed relationship, a tie-down process called "broom stitching" has been used. Broom stitching is difficult hand labor which requires tieing of individual elements of bundles together. Each bundle is tied in a "clove hitch," then knotted, and tied to the next bundle at a number of points. Broom stitching, as a process, is quite time consuming. Furthermore, the tie-downs offer a substantial amount of flexure and are often not too secure. For example, when used in electrochemical machinery wherein the tie-down serves the additional purpose of holding the conductors from the path of moving machinery, a failure by a weak broom stitch is likely to cause complete disablement of the equipment.

It is therefore a primary object of this invention to provide an improved wiring harness.

Another object of this invention is to increase the speed with which individual tie-downs may be made in the process of securing bundles of filaments to a fixture.

An additional object of this invention is to reduce the cost of bundling together securely groups of wires.

A more particular object of this invention is to strengthen the lacing securing bundles of filaments to a fixture.

An additional specific object of this invention is to enhance the electrostatic and electromagnetic shielding effects possible through the use of filament bundling devices.

Yet another object of this invention is to eliminate a substantial amount of the skill normally necessary for providing wiring bundle tie-downs.

To satisfy the above-listed objects, a new harness piece has been devised. The new harness piece includes a light, small, generally fork-shaped piece of relatively-rigid material forming a U-channel and including a base portion which may be affixed by various means to the supporting structure and a plurality of upstanding members or tines for dividing and securing the various filaments of the bundle. The harness piece is so devised that it may be secured to the structure by an adhesive or secured by screws. The fork tines provide extremely strong separating elements for the wire filaments and are variously prepared for receiving a securing piece to enclose the bundles. For example, a lacing tie-down may be placed in notches or grooves to close the outer ends of the tines. Advantageously, the notches raise the lace away from the supporting structure so that all of the operation is easily reached and may be accomplished by an unskilled workman. This arrangement substantially cuts the time required for tieing individual harnesses. In particular embodiments, various forms of the harness may be provided which furnish electrostatic and electromagnetic shielding for the bundles. For example, a particular fork may be designed to include a resinous binding material carrying powdered iron for magnetic shielding.

These and other objects and features of the invention will be better understood from the following specific description taken together with the attached drawings. In the drawings, identical designations have been used wherever possible in describing the same elements throughout the various figures.

Figure 1:
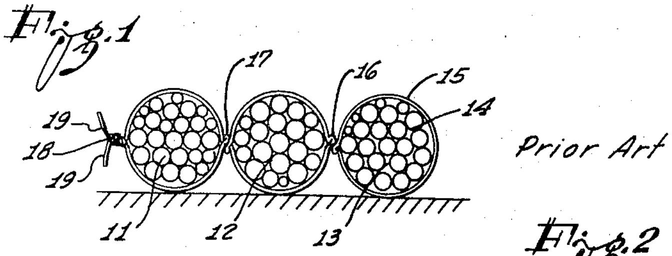
FIGURE 1 is an end-on drawing of a prior art broom stitch normally used in tieing bundles of filaments.

In FIGURE 1 of the drawings, is shown an end-on view of a three part bundle constructed in accordance with the prior art. The bundle comprises sub-bundles 11, 12, and 13 each of which includes a plurality of filaments 14. A lacing 15, which may be constructed of a number of materials—plastic materials are often preferred, is tied separately around each of the sub-bundles. The actual tie encircling each sub-bundle is normally a clove hitch. Knots are placed at each of positions 16, 17, and 18. The ends 19 project from the final bundle.

Various problems are apparent from the FIGURE 1. For example, the projection of the ends 19 gives rise to the possibility of interference with various mechanical movements of the equipment. The actual tieing of the clove hitches and the multiple knots which has been found necessary entails a substantial amount of time. For example, the skilled worker has been found capable of preparing a particular bundle such as that shown in a period of about forty-five seconds whereas a bundle of the same number of strands prepared in accordance with the present invention requires approximately one-third of that time. Furthermore, if the bundle is placed closely adjacent a surface such as that shown in FIGURE 1 and the wires are somewhat inflexible, it is often quite hard to pull the lacing 15 around the various sub-bundles and accomplish the knotting in a secure manner. Quite obviously, the lacing 15 provides no shielding in and of itself; the only shielding is that accomplished by the placement of the various filaments 14 in bundles closely adjacent one another. It is also quite apparent that the material used in lacing 15 may or may not be strong enough to sustain the various mechanical loads placed upon the bundles in particular equipments. If the lacing 15 is used to accomplish the tie-down to the physical surface of the equipment, the extra tieing will lengthen the tie-down time and the various sharp right angles at the securing points of the surface may tend to provide weak spots in the lacings.

Figure 2:
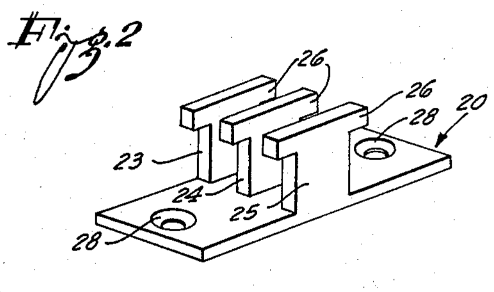
FIGURE 2 is a prospective view of a fork-type wiring harness constructed in accordance with the invention.

In FIGURE 2 is shown a fork-type wiring harness constructed in accordance with the invention. The harness 20 comprises a base piece 21 of rectangular shape. Projecting upwardly from the base piece 21 are three T-shaped tines 23, 24, and 25. Each of these tines has a projection 26 on each side, lending the T shape. The base piece 21 shown in FIGURE 2 has a screw hole 28 drilled therethrough and may have an additional screw hole (not shown) drilled opposite hole 28 for securing the harness 20 to a particular structure.

The harness 20 may be constructed of various materials. In general, the tines should be somewhat rigid. Metals may be used. It has been found that plastic and epoxy materials are especially satisfactory. For example, such materials provide a high dielectric constant shielding piece between the bundles and adjacent electrical elements for reducing the effect of capacitive coupling therebetween. A center tine such as tine 24 also tends to reduce the capacitive coupling between the bundles. In a particularly desirable harness 20 constructed in accordance with the invention, a polyethylene terephthalate has been used to add some flexibility to the tines so that they will have a tendency to bend around the various filament bundles once the ties are made. This may be better visualized by reference to FIGURE 3.

Figure 3:
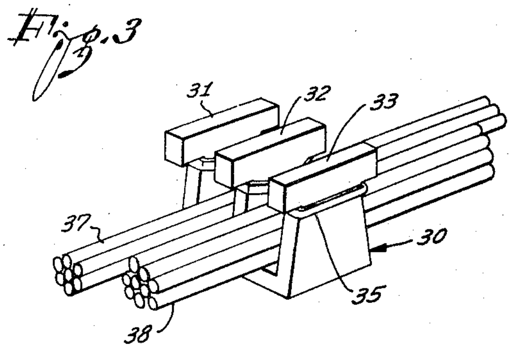
FIGURE 3 is a prospective view of a completed harness of the type shown in FIGURE 2 with filament bundles and with lacing applied.

In FIGURE 3 is shown a harness 30 having filament bundles 37 and 38 placed between three tines 31, 32, and 33. As may be seen, the tine 32 separates the bundles 37 and 38 while the tines 31 and 33 tend to hold the bundles 37 and 38 from sideways movement. The lacing material 35 is shown wound about the upper ends of each of the tines 31, 32, and 33 to secure the bundles 37 and 38 from upward movement. It will be noticed that flexible Mylar tines might be pulled in by the lacing to partially surround the bundles 37 and 38. The notches provided by the projections 26 (shown in FIGURE 2) secure the lace so that it will not slip upwardly and loosen. As will be apparent from FIGURE 3, the lacing is easily secured to the tines 31, 32, and 33 in an exceedingly short time as compared with that required for tieing the harness shown in FIGURE 1. The speed of the operation is enhanced by the fact that the lacing 35 need not surround the bundle of filaments. Also illustrated in FIGURE 3 is a thin layer of adhesive material 39 placed on the bottom of the harness 30 for securing the harness 30 to a supporting member. For particularly strong support, epoxy resin adhesives may be used. Thus the final arrangement will provide extremely strong support in three directions for the bundles 37 and 38.

Figure 4:
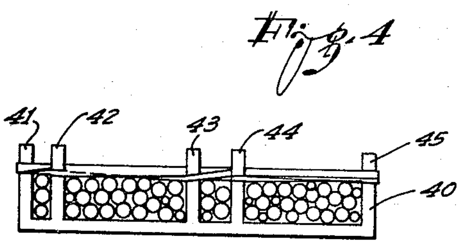
FIGURE 4 is a cross-sectional view of a fork-type wiring harness constructed in accordance with the invention for different size filament bundles.

It will be obvious that the harnesses illustrated and described above may be constructed in various fashions. For example, in FIGURE 4 a harness 40 is shown in cross section. The harness 40 has four channels of varying sizes between its tines 41, 42, 43, 44, and 45. The bundles placed therebetween may thus be shielded and routed as desired by such specially shaped harnesses.

Figure 5:
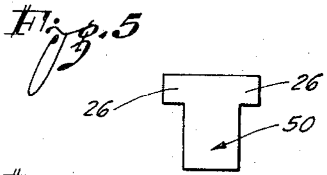
FIGURE 5 is a side view of a particular fork-type wiring harness constructed in accordance with the invention.

FIGURE 5 illustrates a side view of the harness of FIGURE 3 above-described. The notches formed by projections 26 are well illustrated so that the method of tie-down may be easily visualized. The harness 50 shown in FIGURE 5 may have its shape varied so that machining problems may be reduced to a minimum and production costs thereby reduced. For example, notches may be provided for the lacing material instead of the projections 26 (see FIGURE 8).

Figure 6:
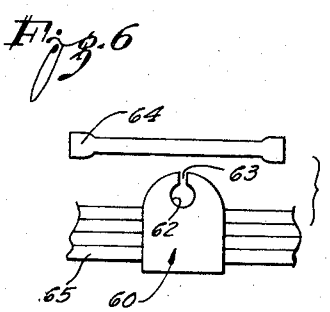
FIGURE 6 is a side view of another fork-type wiring harness constructed in accordance with the invention.

FIGURE 6 illustrates another form of harness 60 which may be used in accordance with the invention. The upstanding members or tines of the harness 60 each have a resilient angularly deformable aperture or hole 62 reached by an angularly deformable slot 63 in the upper edge. A U-channel enclosing bar or solid member 64 shown above the element 60 may be pushed down through the yielding, deformable slot 63, which is adapted to receive bar 64, to hold the bundle of material 65. In such a case, the material from which the harness 60 is constructed should be of a deformable or yielding material such as polyethylene terephthalate. Bar or solid member 64 has an enlarged cross-section at each end to prevent its lateral movement through aperture or hole 62.

Figure 7:
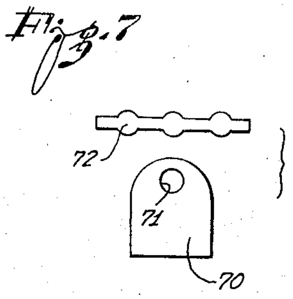
FIGURE 7 is a side view of a third fork-type wiring harness constructed in accordance with the invention.

In FIGURE 7 there is shown another configuration of the harness in accordance with the invention. The harness 70 (shown in end view) has a resilient, radially deformable aperture or hole 71 in each upstanding member or tine. The harness 70 is constructed of deformable or yielding material such as polyethylene terephthalate. A U-channel enclosing bar or solid piece 72 is pulled therethrough to maintain the bundle of filaments. Bar or solid piece 72 may include nodules for preventing its undesired lateral movement through aperture or hole 71.

Figure 8:
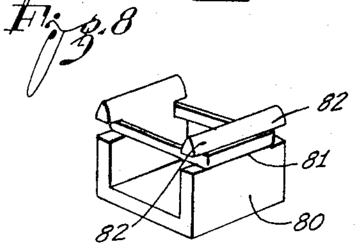
FIGURE 8 is a prospective view of a harness having a distinct tie-down means constructed in accordance with the invention.

FIGURE 8 illustrates another method of tie-down in which a solid harness 80 has a yielding lacing 81 forced over its rounded projections 82. The lace 81 is so dimensioned that a tight fit is provided once it is in place and the bundle is held in an unyielding position. The notches in the tines of harness 80 to hold the lace 81 should be noted. The sharpened upper edges of the tines are also useful in assisting the easy bundling of filaments.

Most of the elements constructed from plastic materials may be injection molded. Of course, they may also be otherwise constructed of other well known materials and by other processes. All of the harnesses above-mentioned provide extremely strong tie-downs for bundles of filaments and assist in shielding conductors electrostatically. The time for accomplishing each particular tie-down with any of the harnesses shown is extremely short compared with that required for tieing the broom stitch type tie-down shown in FIGURE 1.

Figure 9:
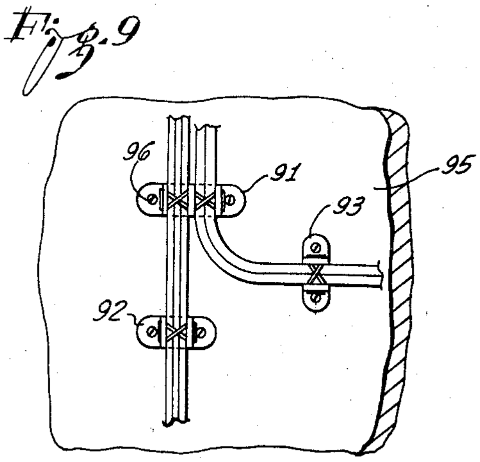
FIGURE 9 is a top view of a number of fork-type wiring harnesses used to securely place bundles of filaments in a particular equipment.

In FIGURE 9 is shown a plan view of a number of filaments connected in bundles and supported to a particular piece of equipment by a number of harnesses constructed in accordance with the invention. The harnesses 91, 92, and 93 shown in FIGURE 9 each have lacing closing the openings between tines over the bundles. Each harness 91, 92, 93, is affixed to the supporting member 95 by a pair of screws (e.g.. the screw 96). It will be obvious from FIGURE 9 that the bundles may run parallel to each other, be divided, and placed in appropriate positions to lead through various paths between assorted devices by the harnesses herein illustrated.

Figure 10:
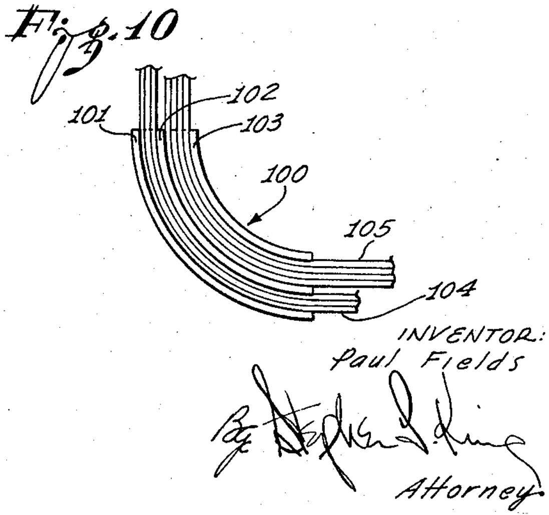
FIGURE 10 is a top view of another wiring harness specifically constructed in accordance with the invention to provide shielding for wire conductors at a right angle turn of the bundles.

In FIGURE 10 is shown another harness constructed in accordance with the invention. The harness 100 of FIGURE 10 has upwardly projecting members 101, 102, and 103 which divide the various bundles of filaments 104 and 105. Though not illustrated, any of the tie-down methods might be used for securing the bundles within the channels provided. For example, the holes shown in the tines of FIGURE 7 could be provided with lacings to secure the bundles 104 and 105. The harness 100 shown in FIGURE 10 is especially useful when shielding is required for conductors along a significant portion of a path. Further, the harness 100 illustrates that by various manufacturing methods (such as injection molding) the invention may be adapted to provide unique results. An additional advantage of the long channeled projections provided by the harness 100 may be realized by including within the material of which the harness 100 is constructed particles of powdered iron or other material which will provide magnetic shielding for the various conductors within the bundles.

It is to be understoood that the above-described arrangements are merely illustrative of the applications of the principles of the invention. Numerous other arrangements may be devised by those skilled in the art without departing from the spirit and scope of the invention.

What is claimed is:

1. A fork-type harness for retaining filaments comprising a unitary member of substantially rigid resilient plastic, said member comprised of a base portion and at least two spaced upstanding tines forming a U-shaped channel, each of said tines having portions forming a resiliently deformable aperture near a free end remote from the base portion, a linear solid channel closing bar member bridging said U-shaped channel and engaging said aperture forming portions of said two upstanding tines, said bar member including spaced portions dimensioned larger than said apertures which deform said apertures forming portions during interengagement of said bar and tines and function to inhibit removal of said bar member from said tines.

2. In the harness of claim 1, wherein said aperture is substantially circular and said bar member has portions of enlarged cross section to radially deform said aperture forming portions during interengagement of said bar member and tines.

3. In the harness of claim 1, wherein said tines have a slot leading from the aperture to said free end permitting resilient angular deformation of the tines during interengagement with the bar.

4. In the harness of claim 1, wherein said plastic material includes a magnetic material for magnetically shielding the filaments within the U-shaped channel.

References Cited

UNITED STATES PATENTS

| | | | |
|---|---|---|---|
| 2,522,072 | 9/1950 | Tierney | 174—35 |
| 2,684,512 | 7/1954 | Beman. | |
| 2,867,681 | 1/1959 | Huehnel | 174—101 |
| 2,896,011 | 7/1959 | Huseby | 174—174 X |
| 2,904,294 | 9/1959 | Marygold. | |
| 2,921.607 | 1/1960 | Caveney | 174—72 X |
| 3,169,439 | 2/1965 | Rapata. | |
| 3,233,851 | 2/1966 | Lemieux et al. | 248—74 X |

FOREIGN PATENTS

| | | |
|---|---|---|
| 576,249 | 5/1959 | Canada. |

OTHER REFERENCES

"A G-C Cable Tie Is Fast and Easy To Use." Advertisement of General Cement Manufacturing Company, Division of Textron, Inc., Los Angeles, Calif., Mar. 25, 1959.

DARRELL L. CLAY, *Primary Examiner.*

L. H. MYERS, *Examiner.*